United States Patent
Li

(10) Patent No.: US 11,088,727 B2
(45) Date of Patent: Aug. 10, 2021

(54) ELECTRONIC DEVICE

(71) Applicant: BEIJING XIAOMI MOBILE SOFTWARE CO., LTD., Beijing (CN)

(72) Inventor: Yueliang Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/743,713

(22) Filed: Jan. 15, 2020

(65) Prior Publication Data
US 2021/0091824 A1   Mar. 25, 2021

(30) Foreign Application Priority Data

Sep. 19, 2019   (CN) .......................... 201910888073.1

(51) Int. Cl.
| | | |
|---|---|---|
| *H04B 5/02* | (2006.01) | |
| *H01Q 1/24* | (2006.01) | |
| *H04B 1/00* | (2006.01) | |
| *H04B 1/401* | (2015.01) | |

(52) U.S. Cl.
CPC .............. *H04B 5/02* (2013.01); *H01Q 1/243* (2013.01); *H04B 1/006* (2013.01); *H04B 1/401* (2013.01)

(58) Field of Classification Search
CPC .......... H04B 5/02; H04B 1/006; H04B 1/401; H01Q 1/243
See application file for complete search history.

(56) References Cited

U.S. PATENT DOCUMENTS

| | | | | |
|---|---|---|---|---|
| 10,158,384 | B1 * | 12/2018 | Yarga | .................... H01Q 13/103 |
| 2006/0114159 | A1 * | 6/2006 | Yoshikawa | ............... H01Q 1/24 |
| | | | | 343/702 |

FOREIGN PATENT DOCUMENTS

| | | | |
|---|---|---|---|
| CN | 105514624 | * | 4/2016 |
| CN | 105514624 | A | 4/2016 |
| CN | 108736130 | * | 11/2018 |
| CN | 108736130 | A | 11/2018 |

OTHER PUBLICATIONS

Extended European Search Report in the European Application No. 20152243.0, dated Apr. 9, 2020, (12p).

* cited by examiner

*Primary Examiner* — Yuwen Pan
*Assistant Examiner* — Angelica M Perez
(74) *Attorney, Agent, or Firm* — Arch & Lake LLP

(57) ABSTRACT

An electronic device includes a middle frame. The middle frame includes a slit, a first strip groove and a second strip groove, and the slit extends inward from an edge of the middle frame so as to be communicated to the first strip groove and the second strip groove; and a first grounding point, a second grounding point, a data signal feed point, a frequency modulation circuit and an NFC feed point. The data signal feed point, the frequency modulation circuit and the NFC feed point as well as the first grounding point are positioned on a same side of the slit, the data signal feed point, the frequency modulation circuit and the first grounding point cooperatively radiate 2G, 3G or 4G communication signals, the data signal feed point, the NFC feed point, the middle frame, the slit and the second grounding point cooperatively radiate 5G communication signals, and the NFC feed point and the first grounding point cooperatively radiate NFC signals.

13 Claims, 6 Drawing Sheets

| Band | First switch | Second switch |
|---|---|---|
| GSM850 | RF3 | ALL OFF |
| WB8 | RF3+RF1 | ALL OFF |
| LTE B1 | RF4 | RF3+RF2 |
| LTE B12 | ALL OFF | ALL OFF |
| N41 | RF4 | RF2 |
| CA_1A-3A | RF4 | RF3+RF2 |

ELECTRONIC DEVICE

CROSS-REFERENCE TO RELATED APPLICATIONS

This application is based upon and claims priority to Chinese Patent Application 201910888073.1, filed on Sep. 19, 2019, the entire contents of which are incorporated herein by reference.

TECHNICAL FIELD

The present disclosure relates to the technical field of electronic terminals, and particularly relates to an electronic device.

BACKGROUND

With the development of the mobile communication technology, it has become an urgent need at present to configure second generation (2G), third generation (3G), fourth generation (4G) and fifth generation (5G) communication functions for an electronic device. Furthermore, in order to facilitate the user's travel, the electronic device may generally have a near field communication (NFC) function. In order to be compatible with the above communication functions, how to configure an antenna in the electronic device has become an important topic.

SUMMARY

An aspect of the present disclosure provides an electronic device, including: a middle frame, wherein the middle frame includes a slit, a first strip groove and a second strip groove, the slit extends inward from an edge of the middle frame so as to be communicated to the first strip groove and the second strip groove, and one end of the first strip groove and one end of the second strip groove are close to each other; a first grounding point, wherein the first grounding point is positioned at one end of the first strip groove away from the second strip groove; a second grounding point, wherein the second grounding point is positioned at one end of the second strip groove away from the first strip groove, and the first grounding point and the second grounding point are respectively positioned at two sides of the slit; and a data signal feed point, a frequency modulation circuit and a near field communication (NFC) feed point, wherein the data signal feed point, the frequency modulation circuit and the NFC feed point as well as the first grounding point are positioned on a same side of the slit; wherein the data signal feed point, the frequency modulation circuit and the first grounding point cooperatively radiate 2G communication signals, 3G communication signals or 4G communication signals, the data signal feed point, the NFC feed point, the middle frame, the slit and the second grounding point cooperatively radiate 5G communication signals, and the NFC feed point and the first grounding point cooperatively radiate NFC signals.

It should be understood that the above general description and the following detailed description are merely exemplary and explanatory, but they are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terms used in the present disclosure are for the purpose of describing specific embodiments only, and are not intended to limit the present disclosure. The singular forms "a", "the" and "this" used in the present disclosure and the appended claims may also include plural forms unless the contexts clearly indicate other meanings. It should also be understood that the term "and/or" used herein refers to and includes any and all possible combinations of one or more of the associated listed items.

It should be understood that although the terms "first", "second" and "third" may be adopted in the present disclosure to describe various information, these information should not be limited to these terms. These terms are only used to distinguish the same type of information from each other. For example, the first information may also be referred to as the second information without departing from the scope of the present disclosure. Similarly, the second information may also be referred to as the first information. Depending on the context, the word "if" as used herein may be interpreted as "when" or "while" or "in response to determining".

Figure 1:
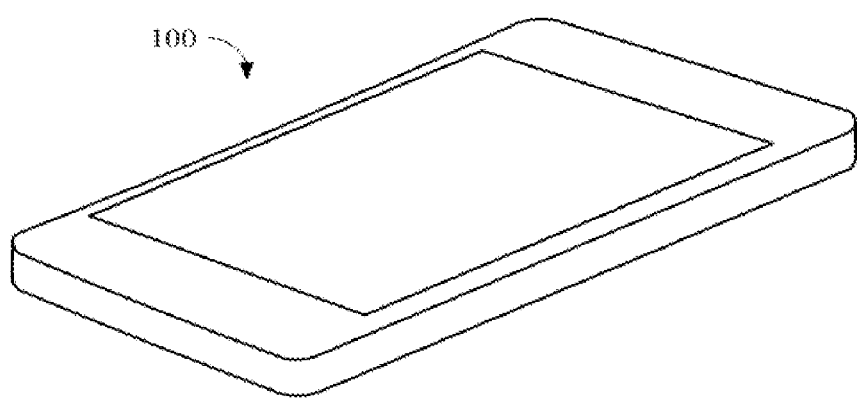
FIG. 1 is a schematic diagram of an electronic device according to an example.
Figure 2:
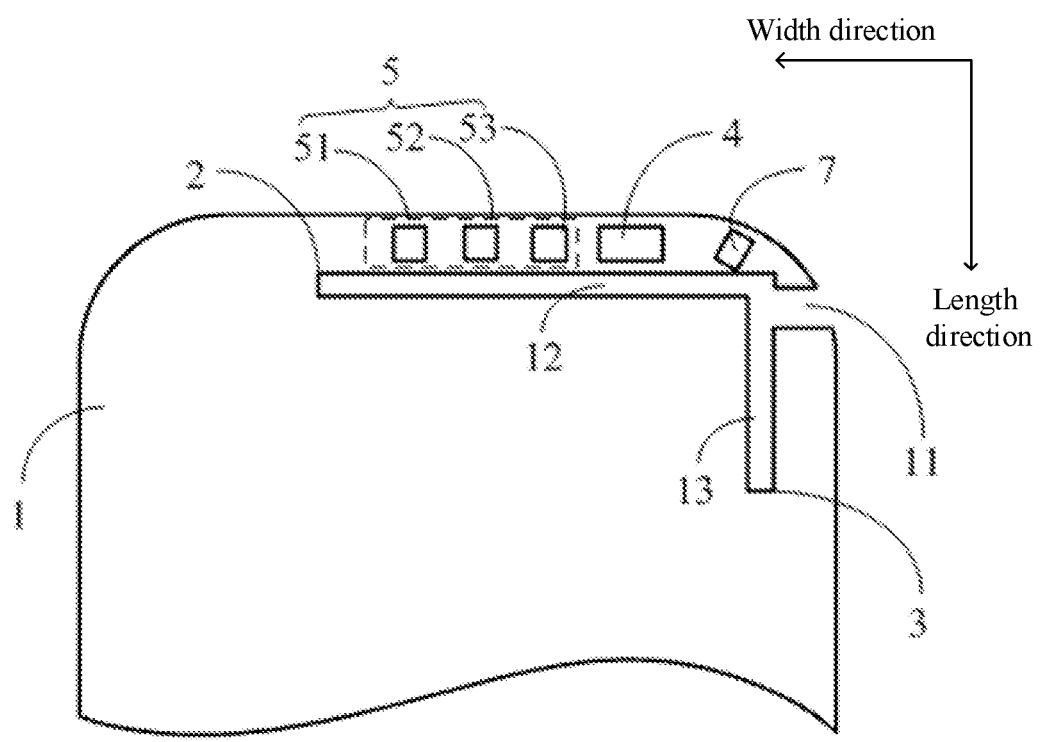
FIG. 2 is a partial schematic diagram of an electronic device according to an example.

FIG. 1 is a schematic diagram of an electronic device 100 according to an example. FIG. 2 is a partial schematic diagram of an electronic device 100 according to an example. As shown in FIG. 1 and FIG. 2, the electronic device 100 may include a middle frame 1, the middle frame 1 may include a slit 11, a first strip groove 12 and a second strip groove 13, the slit 11 may be formed by extending inward from an edge of the middle frame 1 and may be communicated to the first strip groove 12 and the second strip groove 13. One end of the first strip groove 12 and one end of the second strip groove 13 are close to each other. For example, the first trip groove 12 may be separated from the second strip groove 13 by the slit 11. And the first strip groove 12 and the second strip groove 13 may be disposed close to the edge of the middle frame 1, so that the portions from the edges of the strip grooves to the edge of the middle frame 1 may be used as portions of an antenna. The first strip groove 12 and the second strip groove 13 may also be perpendicular to each other. For example, as shown in FIG. 2, the first strip groove 12 may be disposed along a width direction of the middle frame 11, and the second strip groove 13 may be disposed along a length direction of the middle frame 11.

Further, the electronic device 100 may also include a first grounding point 2 and a second grounding point 3. The first grounding point 2 is positioned at one end of the first strip groove 12 away from the second strip groove 13. And similarly, the second grounding point 3 is positioned at one end of the second strip groove 13 away from the first strip groove 12. The electronic device 100 may also include a data signal feed point 4, a frequency modulation circuit 5 and an NFC feed point 6. The data signal feed point 4, the frequency modulation circuit 5 and the NFC feed point 6 are positioned on a same side of the slit 11 as the first grounding point 2, and are positioned on a different side of the slit 11 from the side where the second grounding point 3 is positioned. As shown in FIG. 2, the data signal feed point 4, the frequency modulation circuit 5 and the NFC feed point 6 are positioned above an extension line of the slit 11, and the second grounding point 3 is positioned below the extension line of the slit 11.

The data signal feed point 4, the frequency modulation circuit 5 and the first grounding point 2 may cooperatively transmit or radiate 2G communication signals, 3G communication signals or 4G communication signals; the data signal feed point 4, the NFC feed point 6, the middle frame 1, the slit 11 and the second grounding point 3 may cooperatively transmit or radiate 5G communication signals; and the NFC feed point 6 and the first grounding point 2 may cooperatively transmit or radiate NFC signals.

As can be seen from the above embodiments, a communication antenna for 2G communication, 3G communication and 4G communication, a communication antenna for 5G communication and an antenna for NFC in the present disclosure may be partially shared, and a data communication function and an NFC function of the electronic device 100 may be realized simultaneously, thus the space occupied by antennas is reduced, which is beneficial for the internal layout of the electronic device 100.

In one or more embodiments, as shown in FIG. 2, a frequency modulation circuit 5 may include a first switch 51, a second switch 52 and a tuning circuit 53. The first switch 51, the second switch 52, and the data signal feed point 4 are sequentially disposed in a direction from the first grounding point 2 to the slit 11. The first switch 51 is connected in series with the second switch 52, and the second switch 52 is electrically connected with the data signal feed point 4, so that full-band coverage of 2G communication, 3G communication, and 4G communication is realized by adjusting the first switch 51, the second switch 52, and the tuning circuit 53.

Figure 3:
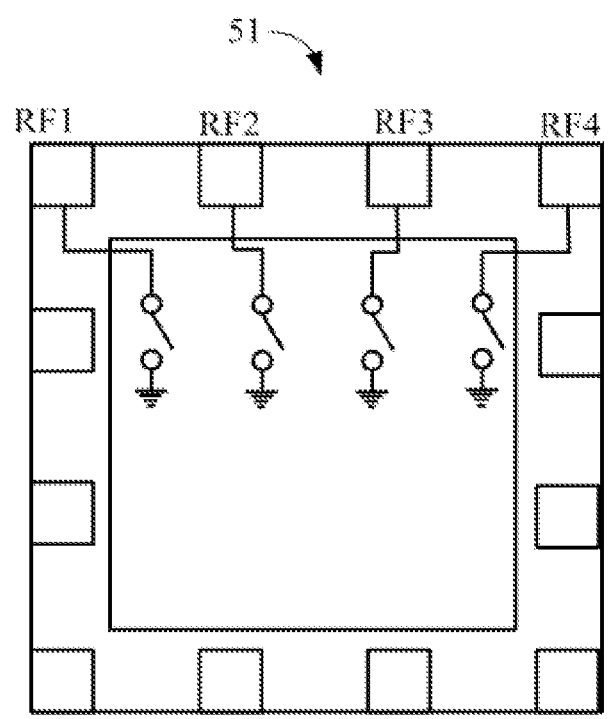
FIG. 3 is a circuit schematic diagram of a first switch according to an example.
Figure 4:
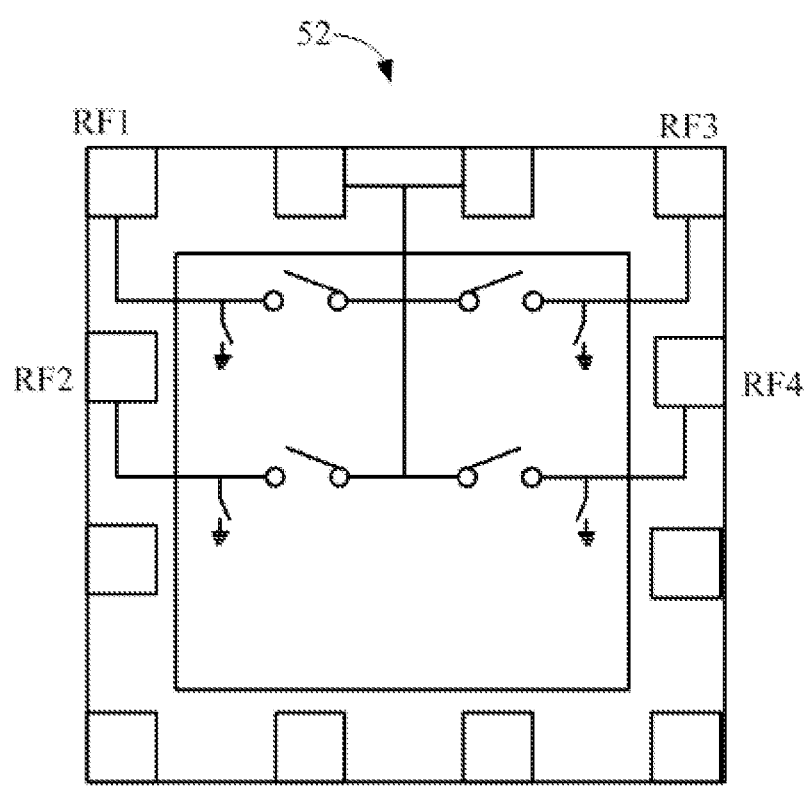
FIG. 4 is a circuit schematic diagram of a second switch according to an example.
Figures 5, 6:
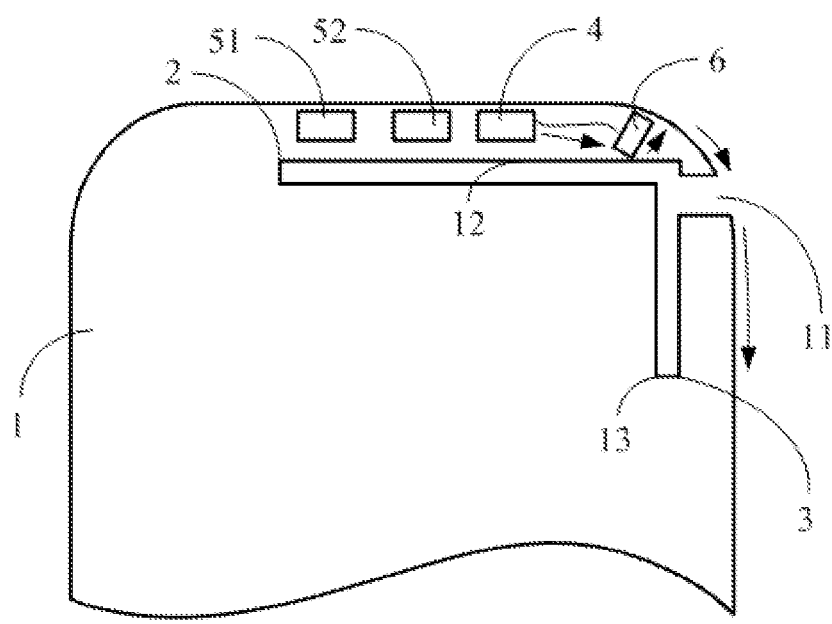
FIG. 5 is a schematic diagram of frequency modulation according to an example.
FIG. 6 is a partial schematic diagram of another electronic device according to an example.

For example, the first switch 51 may adopt a QM13144 type switch as shown in FIG. 3, and the second switch 52 may adopt a QM13136 type switch as shown in FIG. 4. The first switch 51 may include switches RF1, RF2, RF3 and RF4, and similarly, the second switch 52 may also include switches RF1, RF2, RF3 and RF4. The state adjustment of the first switch 51 and the second switch 52 may be as shown in FIG. 5. When signals of GSM850 are radiated, the switch RF3 of the first switch 51 may be turned on, and the switches RF1, RF2, RF3 and RF4 of the second switch 52 may be turned off. For another example, when signals of N41 are radiated, the switch RF4 of the first switch 51 may be turned on, and the switch RF4 of the second switch 52 may be turned off. Still as shown in FIG. 5, during signal radiation of other bands, the first switch 51 and the second switch 52 may have corresponding different states. Of course, in addition to the antenna signals of the bands as shown in FIG. 5, the antenna signals of other bands may also be radiated, and the present disclosure will not be exemplified one by one.

In some embodiments, as shown in FIG. 6, the NFC feed point 6 and the data signal feed point 4 may be adjacently disposed, the data signal feed point 4 and the slit 11 are positioned at two sides of the NFC feed point 6, and the NFC feed point 6 is electrically connected to the data communication feed point 3. Therefore, as shown in FIG. 6, when the electronic device 100 is in a 5G communication state, an antenna signal received by the data signal feed point 4 may be output to the NFC feed point 6, further output to the middle frame 7 through a grounding end of the NFC feed point 6 and then coupled to another edge of the slit 11 via the slit 11, and finally flows into the second grounding point 3.

Figure 7:
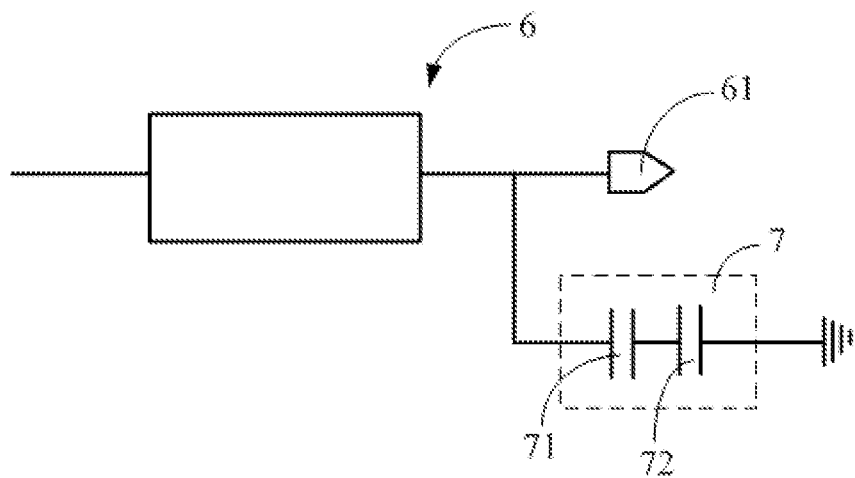
FIG. 7 is a schematic diagram of connection between an NFC feed point and a tuning circuit according to an example.

In each of the above embodiments, as shown in FIG. 7, the electronic device 100 may also include a 5G tuning circuit 7, Here, the 5G tuning circuit 7 is connected in parallel with a signal receiving end 61 of the NFC feed point 6, the 5G tuning circuit 7 may be configured to adjust the communication band of 5G communication signals, and the signal receiving end 61 may be configured to receive NFC signals. Based on the above, the band during 5G communication may be adjusted by the tuning circuit, and a stopband can be formed for the NFC band, thereby ensuring that the NFC signals can be output from the NFC feed point 6 to the first grounding point 2.

For example, as shown in FIG. 7, the 5G tuning circuit 7 may include a first capacitor 71 and a second capacitor 72 connected in series. Through the two capacitors connected in series, on the one hand, the band of the 5G communication signals may be adjusted; and on the other hand, since the manufacturing accuracy of a single capacitor tends to be lower than the theoretical requirement, the present disclosure adopts the two capacitors connected in series to reduce the requirement for the manufacturing accuracy and reduce the amplitude of antenna offset. For example, a capacitance of the first capacitor 71 may be 0.6 pF to 0.8 pF, and more preferably 0.7 pF, and a capacitance of the second capacitor 72 may be 0.8 pF to 1.0 pF, and more preferably 0.9 pF.

Figure 8:
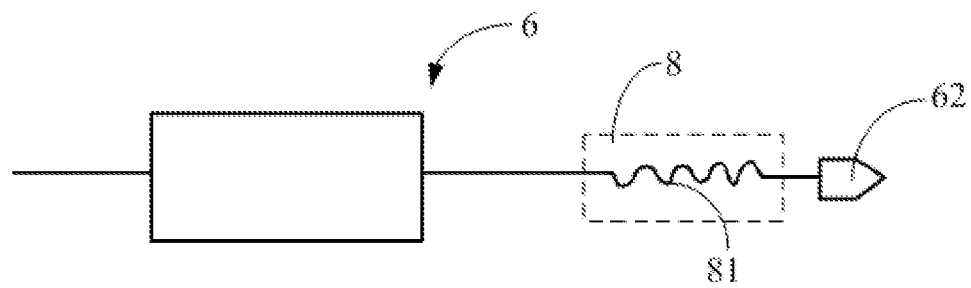
FIG. 8 is a schematic diagram of connection between an NFC feed point and a high-frequency suppression circuit according to an example.

Similarly, as shown in FIG. 8, the electronic device 100 may also include a high-frequency suppression circuit 8, the high-frequency suppression circuit 8 is connected in series with another signal receiving end 62 of the NFC feed point 6, and the high-frequency suppression circuit 8 is configured to suppress the 5G communication signals. For example, the high-frequency suppression circuit 8 may include an inductor 81 having an inductance greater than a preset threshold. For example, the inductance of the inductor 81 may be 68 nH, 60 nH, 70 nH, or the like. The present disclosure is not limited thereto.

In some embodiments, the electronic device 100 may also include a circuit board (not shown), the circuit board is electrically connected with the first switch 51, the second switch 52, the NFC feed point 6 and the data signal feed point 4, and the inductor 81 may also be welded on the circuit board. In fact, since the inductance of the inductor 81 is larger, the welding point between the inductor 81 and the circuit board is too large, and the loading capacitance is easily formed, resulting in frequency offset. Therefore, in the present disclosure, the circuit board includes a hollowed-out area corresponding to the inductor 81 so as to reduce the frequency offset and reduce the parasitic capacitance.

Other embodiments of the present disclosure will be apparent to those skilled in the art from consideration of the specification and practice of the disclosure here. The present disclosure is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An electronic device, characterized in that, the electronic device comprises:
    a middle frame (1), wherein the middle frame (1) comprises a slit (11), a first strip groove (12) and a second strip groove (13), wherein the slit (11) extends inward from an edge of the middle frame (1) so as to be communicated to the first strip groove (12) and the second strip groove (13), and one end of the first strip groove (12) and one end of the second strip groove (13) are close to each other;
    a first grounding point (2), wherein the first grounding point (2) is positioned at one end of the first strip groove (12) away from the second strip groove (13);
    a second grounding point (3), wherein the second grounding point (3) is positioned at one end of the second strip groove (13) away from the first strip groove (12), and the first grounding point (2) and the second grounding point (3) are respectively positioned at two sides of the slit (11); and
    a data signal feed point (4), a frequency modulation circuit (5) and a near field communication, NFC, feed point (6), wherein the data signal feed point (4), the frequency modulation circuit (5) and the NFC feed point (6) as well as the first grounding point (2) are positioned on a same side of the slit (11);
    wherein the data signal feed point (4), the frequency modulation circuit (5) and the first grounding point (2) cooperatively radiate second generation, 2G, communication signals, third generation, 3G, communication signals or fourth generation, 4G, communication signals, the data signal feed point (4), the NFC feed point (6), the middle frame (1), the slit (11) and the second grounding point (3) cooperatively radiate fifth generation, 5G, communication signals, and the NFC feed point (6) and the first grounding point (2) cooperatively radiate NFC signals, and
    wherein the data signal feed point (4) and the slit (11) are positioned at two sides of the NFC feed point (6), the NFC feed point (6) is electrically connected to the data signal feed point (4), and when the electronic device is in a 5G communication state, an antenna signal received by the data signal feed point (4) is output to the NFC feed point (6), further output to the middle frame (1) through a grounding end of the NFC feed point (6) and then coupled to another edge of the slit (11) via the slit (11), and finally flows into the second grounding point (3).

2. The electronic device of claim 1, wherein the frequency modulation circuit (5) comprises a first switch (51), a second switch (52) and a tuning circuit (53), and full-band coverage of 2G communication, 3G communication or 4G communication is implemented by adjusting the first switch (51), the second switch (52) and the tuning circuit (53).

3. The electronic device of claim 1, wherein the NFC feed point (6) is adjacent to the data signal feed point (4), wherein the NFC feed point (6) is electrically connected to the data signal feed point (4) to form a path for 5G communication signals.

4. The electronic device of claim 1, further comprising a 5G tuning circuit (7), wherein the 5G tuning circuit (7) is connected in parallel with a signal receiving end (61) of the NFC feed point (6), and the 5G tuning circuit (7) is configured to adjust a communication band of the 5G communication signals.

5. The electronic device of claim 4, wherein the 5G tuning circuit (7) comprises a first capacitor (71) and a second capacitor (72) connected in series.

6. The electronic device of claim 5, wherein a capacitance of the first capacitor (71) is 0.7 pF, and a capacitance of the second capacitor (72) is 0.9 pF.

7. The electronic device of claim 1, further comprising a high-frequency suppression circuit (8), wherein the high-frequency suppression circuit (8) is connected in series with a signal receiving end (62) of the NFC feed point (6), and the high-frequency suppression circuit (8) is configured to suppress the 5G communication signals.

8. The electronic device of claim 7, wherein the high-frequency suppression circuit (8) comprises an inductor having an inductance greater than a preset threshold.

9. The electronic device of claim 8, wherein the inductance of the inductor is 68 nH.

10. The electronic device of claim 8, further comprising a circuit board, wherein the frequency modulation circuit (5), the NFC feed point (6) and the data signal feed point (4) are connected to the circuit board, and the circuit board comprises a hollowed-out area corresponding to the inductor.

11. The electronic device of claim 1, wherein the first strip groove (12) and the second strip groove (13) are perpendicular to each other.

12. The electronic device of claim 1, wherein the first strip groove (12) is disposed along a width direction of the middle frame (1), and the second strip groove (13) is disposed along a length direction of the middle frame (1).

13. The electronic device of claim 1, wherein the first strip groove (12) and the second strip groove (13) are disposed close to the edge of the middle frame (1), so that portions from edges of the strip grooves to the edge of the middle frame (1) are used as portions of an antenna.

* * * * *